United States Patent
Sadjadpour et al.

(10) Patent No.: US 6,393,052 B2
(45) Date of Patent: May 21, 2002

(54) METHOD AND APPARATUS FOR MINIMIZING NEAR END CROSS TALK DUE TO DISCRETE MULTI-TONE TRANSMISSION IN CABLE BINDERS

(75) Inventors: Hamid R. Sadjadpour, West Caldwell; Ranjan V. Sonalkar, North Caldwell, both of NJ (US)

(73) Assignee: AT&T Corporation, New York, NY (US)

(*) Notice: Subject to any disclaimer, the term of this patent is extended or adjusted under 35 U.S.C. 154(b) by 0 days.

(21) Appl. No.: 09/769,516

(22) Filed: Jan. 26, 2001

Related U.S. Application Data

(60) Provisional application No. 60/183,308, filed on Feb. 17, 2000.

(51) Int. Cl.[7] .................................................. H04B 1/38
(52) U.S. Cl. ........................................ 375/222; 375/219
(58) Field of Search ................................. 375/222, 219, 375/225; 379/93.01, 27, 88.17; 320/201, 524

(56) References Cited

U.S. PATENT DOCUMENTS

| | | | | |
|---|---|---|---|---|
| 5,991,311 A | * | 11/1999 | Long et al. | 370/524 |
| 6,144,696 A | * | 11/2000 | Shively et al. | 370/358 |

FOREIGN PATENT DOCUMENTS

| | | |
|---|---|---|
| EP | 0 905 948 A | 3/1999 |
| EP | 0 930 752 A | 7/1999 |
| EP | 0 959 596 A | 11/1999 |
| WO | WO 99 33215 A | 7/1999 |

OTHER PUBLICATIONS

Diggavi, Suhas N., "Multiuser DMT: A Multiple Access Modulation Scheme", IEEE Global Telecommunications Conference, Nov. 18, 1996. pp. 1566–1570.
Sonalker, Ranjan V. et al., "An Efficient Bit–Loading Algorithm For DMT Applications", IEEE Global Telecommunications Conference, Nov. 8, 1998. pp. 2683–2688.
Search Report.

* cited by examiner

Primary Examiner—Chi Pham
Assistant Examiner—Khai Tran
(74) Attorney, Agent, or Firm—Banner & Witcoff, Ltd.

(57) ABSTRACT

In a discrete multi-tone modem, a method of minimizing cross talk over a twisted pair of a twisted pair cable binder in which discrete multi-tone data transmission is utilized comprises the steps of one of jointly minimizing near end cross talk while maximizing total data rate, jointly minimizing an arbitrary function of total power while maximizing total data rate and minimizing total near end cross talk for a given data rate, selecting a function to be optimized and performing a bit and power allocation algorithm responsive to the selected function. The process may be combined with known optimization functions such as jointly minimizing an average bit error rate while maximizing the data rate. As a result, the process is considerably more flexible and adaptable to changing parameters such as environmental parameters impacting data transmission performance in the presence of cross talk. Either a telecommunications central office modem or a remote terminal modem may be so adapted to apply such a cross talk minimization method.

10 Claims, 4 Drawing Sheets

METHOD AND APPARATUS FOR MINIMIZING NEAR END CROSS TALK DUE TO DISCRETE MULTI-TONE TRANSMISSION IN CABLE BINDERS

This invention claims the benefit of earlier filed U.S. provisional patent application Ser. No. 60/183,308, filed Feb. 17, 2000.

FIELD OF THE INVENTION

The invention relates to a method and apparatus for minimizing near end cross talk due to discrete multi-tone (DMT) transmission in cable binders.

BACKGROUND OF THE INVENTION

In digital communication systems employing multi-channel or multi-carrier transmission, the most effective allocation of bits to the channels has been discussed in the literature. The well-known solution from information theory, analogized to pouring water over a terrain defined by the noise/attenuation of the channel transform characteristic, has been found to insure efficient use of signal power within limits defined by aggregate power and power spectral density mask limits. However, the method in some instances may not go as far as possible in exploiting available power imposed by these limits.

For heuristic purposes, the prior art and the invention are discussed in terms of N quadrature amplitude modulation (QAM) channels with a uniform symbol rate and a non-uniform (unique to each channel) QAM constellation. QAM, a form of combined amplitude and phase modulation, represents k-bit sets of data by modulating two (orthogonal) quadrature carriers, cos $2\pi fct$ and sin $2\pi fct$ to generate a pulse whose phase and amplitude convey the encoded k-bits of information. The QAM signal tone can be and amplitude convey the encoded k-bits of information. The QAM signal tone can be viewed as a phasor in the complex plane, each distinguishable phasor representing a unique state of the tone identified with one unique value in a range. Thus, if the channel and signal power are such that 4 separate phasors can be reliably distinguished, the scheme allows two bits to be represented. For 3 bits to be represented, 8 phasors must be distinguished and so on. The number of different phasors or states that are distinguishable in a single tone (pulse), the QAM constellation, is limited by the signal to noise ratio of the channel and limits imposed by external standards as discussed below.

In a DMT modem, a transmission frequency band is separated into N sub-bands or frequency bins, each corresponding to one QAM channel. In a non-ideal channel each sub-band has a different capacity as a result of the variation of noise and attenuation with frequency. In addition, external standards impose limits on the aggregate power of a signal (the power applied in all sub-band channels) and a cap on the power as a function of frequency defined by a power spectral density mask.

The power spectral density mask may be dictated by a standard used in a particular country implementing the standard (such as A.N.S.I. standard T1.413-1995). The mask may also be a design constraint intentionally imposed by a modem designer for some other reason. For example, a designer may intentionally impose a constraint that no more than n bits are to be transmitted on a transmit channel frequency. Similarly, the designer may impose a constraint that a minimum of bits (or no bits) must be transmitted on a particular tone or frequency. For example, the power limit for frequencies or tones between 0 and 200 kilohertz must be less than −40 dBm/Hz (a power level referenced to one milliwatt over 1 Hz bandwidth). Above 200 kHz (to frequencies, for example, in the megahertz of spectrum), the constraint may be −34 dBm/Hz.

Referring to FIG. 1, the attenuation/noise characteristics of a medium can be graphically represented by a floor in a power spectral graph where frequency may be represented in 100 kHz increments. The lower curve, the channel transform characteristic A, represents this floor, that is, the combined effect of noise and attenuation as a function of frequency. A certain margin of transmit power is required to meet or exceed the minimum threshold of a signal for reliable data transmission. In other words, the power of a signal in a given sub-band must be sufficiently high to carry a minimal (1-bit) QAM tone to obtain a predefined bit error rate. The minimum margin, that is required to transmit a single bit, is represented by curve B. Curve C represents the limits imposed by a power spectral density mask imposed by an external communications standard. The other limit is on the aggregate power, also defined by an external communication standard; for example, ANSI Standard T1.413-1995 limits the total or aggregate power for all sub-bands to 100 mWatts in the downstream direction. Some coding techniques, such as Wei code described in American National Standard for Telecommunications—Network and Customer Installation Interfaces—Asymmetric Digital Subscriber Line Metallic Interface, ANSI T1.413-1995, may also require a minimum number of bits in a frequency band if the band is to convey any information at all. In other words, the power spectral density mask limit may require that less energy be used than the minimum required to transmit a single bit.

Note that the minimum allowable size of the power margin is, in part, arbitrary, since, to an extent, it is defined in terms of some a priori rules and technical criteria (which are arbitrary to the extent that they establish a dividing line between acceptable and unacceptable error rates; Bit Error Rate or BER) for the given communication system. Note also that the size of the margin available for a given sub-band corresponds to the dimension of the constellation that can be represented in a signal carried in that QAM channel. That is, the larger the margin in a band, the greater the number of states that can be reliably distinguished in that band and the larger the constellation that can be used.

The above context creates a bit-allocation problem. That is, given the constraints, how should bits be allocated among the available QAM channels to provide the highest possible data rates? DSL modems that use DMT modulation concentrate the transmitted information in the frequency sub-bands that have the minimum attenuation and noise. The optimum distribution of transmission power is obtained by distributing the power according to the well-known "water pouring" analogy as described in Robert C. Gallagher, Information Theory and Reliable Communication, John Wiley and Sons, New York, 1968. Such optimal distribution requires a strategy for allocating bits to the sub-bands for the idealized situation where the channel sub-bands approach zero width. For discrete bits, the applicable metaphor could be described as an ice-cube pouring analogy.

Digital Subscriber loop (DSL) technology was conceived to maximize the throughput on twisted pair copper wiring with attendant background noise, time-variant Far End Cross Talk (FEXT) and Near End Cross Talk (NEXT). To determine the transform characteristic of the channel, the modems at a telecommunications central office and a remote terminal negotiate during an initial channel signal-to-noise ratio (SNR) estimation procedure. During the procedure, the transmitter sends a known pseudo noise (PN) signal. The receiver computes the characteristics of the received signal in the form of a ratio $N_k/g_k$, where $g_k$ is the channel gain (inverse of the attenuation) in frequency band k and $N_k$ is the noise power in the band k. The literature contains many algorithms for determining the power distribution across the full frequency bandwidth for maximum data throughput. As noted above, the optimum approach for a non-uniform Gaussian noise channel divided such that each band can be considered an additive white Gaussian noise channel has been proved to be the "water pouring" algorithm of power distribution. In this case, the $g_k/N_k$ profile is compared to a terrain and the available aggregate power limit to a fixed supply of water poured over the terrain. The depth of the water corresponds to the power spectral density. The water pouring analogy is inappropriate to allocation of power in digital channels intended for transmission of binary data (bits).

The Digital Subscriber Loop (DSL) modems that use the Discrete Multi-Tone (DMT) technology must use an algorithm for assigning data bits to the multiple tones that are used for modulation. Some algorithms exist in the literature that are designed to optimally allocate the data bits and the budgeted power to the multiple tones. Most of these algorithms are based on the 'water-filling' approach that postulates that optimal power allocation is obtained when the noise to attenuation ratio is considered as the 'terrain' and the available power is treated as 'water' to be poured on the terrain. All these algorithms utilize various performance functions that minimize the total allocated power, or maximize the data rate, or a combination of the two. The algorithms are designed with the purpose of either maximizing the total transmitted data rate or meeting the desired data rate, within the constraints of the budgeted total power. This strategy is quite appropriate when the required data rate is such that the DSL transmission loop is power limited. In other words, the bit and power allocation algorithm must perform the allocation such that the maximum number of data bits per frame is allocated to the frequency bins that require the least amount of power for achieving the desired bit error rate (BER).

However, not all cases are power limited. When the required data rate is less than the maximum rate that can be supported on the loop, the assignment of data bits to frequency bins will depend upon the minimization strategy used by the allocation algorithm. The conventional algorithms minimize the total power used for transmitting a given number of data bits in one DMT frame such that the receiver experiences an average BER that is equal to the desired BER. The primary problem at the central office (CO) is that of higher near end cross talk (NEXT) and the algorithms that minimize power may not necessarily minimize the NEXT at the CO, even though the NEXT is proportional to the transmit power.

SUMMARY OF THE INVENTION

It is an object of the invention to provide a method and apparatus for allowing any bit/power allocation algorithm to meet the objective of minimizing the near end cross talk at the central office.

The algorithms in the prior art do not specifically attempt to minimize the near end cross talk at the central office, although the implicit intentions of the algorithm designers include the objective of minimizing the NEXT. All other algorithm designers have assumed that since the NEXT is linearly proportional to the transmitted power, minimizing the transmit power is sufficient to minimizing the cross-talk. However, the coupling of the transmit power in a typical cable binder of pairs of twisted copper wires from a source pair to a disturber pair within the binder is a non-linear function of frequency. Therefore, equal power values in two different frequency bins result in different levels of cross-talk power. The invention solves this problem by altering the performance function that is used by the conventional algorithms.

BRIEF DESCRIPTION OF THE DRAWINGS

The foregoing summary of the invention, as well as the following detailed description of the preferred embodiments, is better understood when read in conjunction with the accompanying drawings, which are included by way of example, and not by way of limitation with regard to the claimed invention:

DETAIL DESCRIPTION

Figure 1:
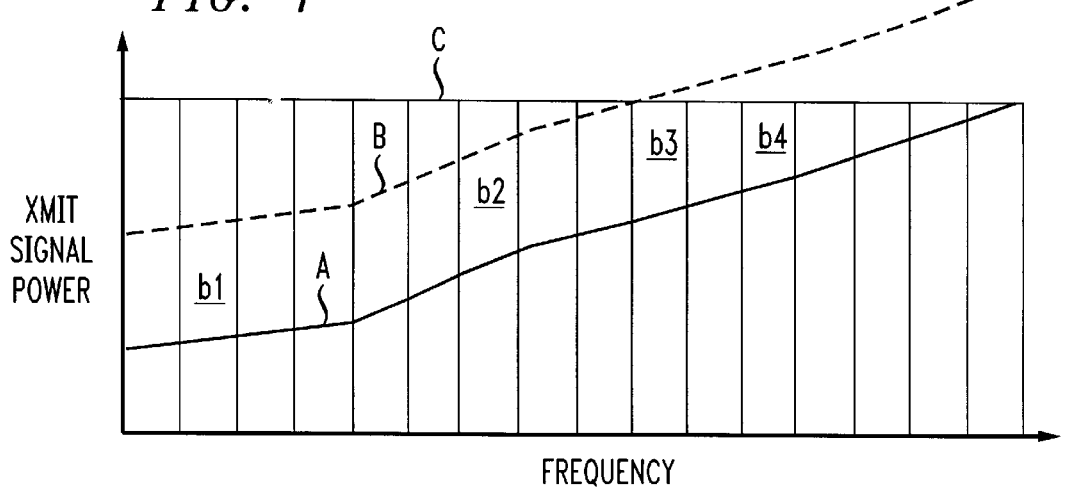
FIG. 1 shows an arbitrary transform characteristic of an arbitrary channel of signal transmit power versus frequency with multi-tone channels, a power spectral density mask limit, and a minimum power required to transmit a single bit, assuming a specific error and symbol rates, superimposed thereon
Figure 1A:
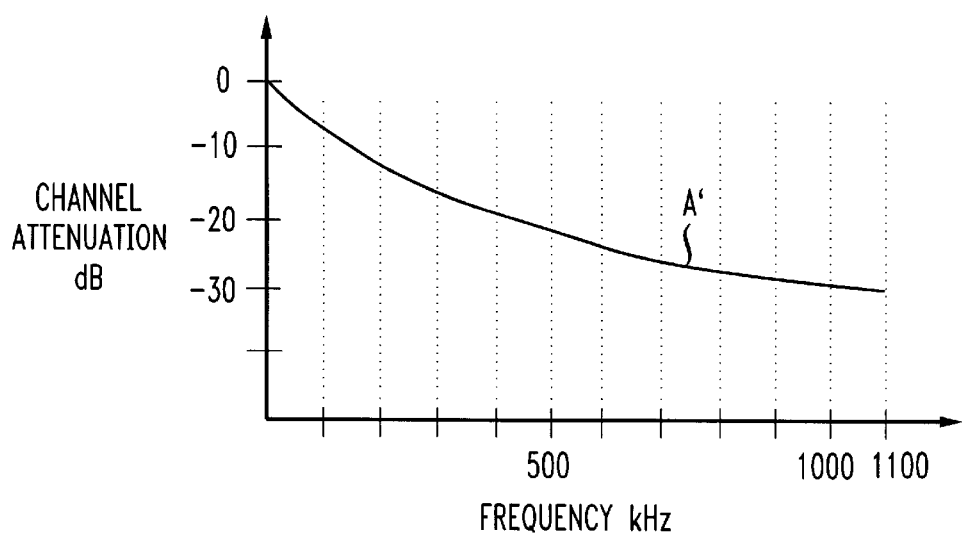
FIG. 1A is a graph of a typical cable characteristic showing channel attenuation as a function of frequency, where in both FIGS. 1 and 1A, frequency is shown in increments of 100 kHz.
Figure 2:
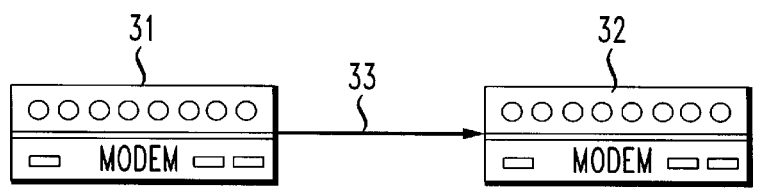
FIG. 2 shows a modem in communication over one or more twisted wire pairs for purposes of describing an embodiment of the invention.

Referring to FIGS. 1, 1A and 2, a transmitting modem 31 is connected to a receiving modem 32 by a cable 33 having one twisted pair of conductors. In long loop systems where cable 33 is of length of the order 18,000 feet or more, high signal attenuation at higher frequencies (greater than 500 kHz) is observed. This characteristic of a typical cable 33 is represented graphically by curve A' in FIG. 1A.

For convenience of description, the details of digital modulator 14 and digital demodulator 16 are described in terms of a QAM multitone system, although the invention is applicable to other kinds of multi-carrier and multi-channel signaling as will be understood by those skilled in the art in light of the teachings disclosed herein.

Figure 3:
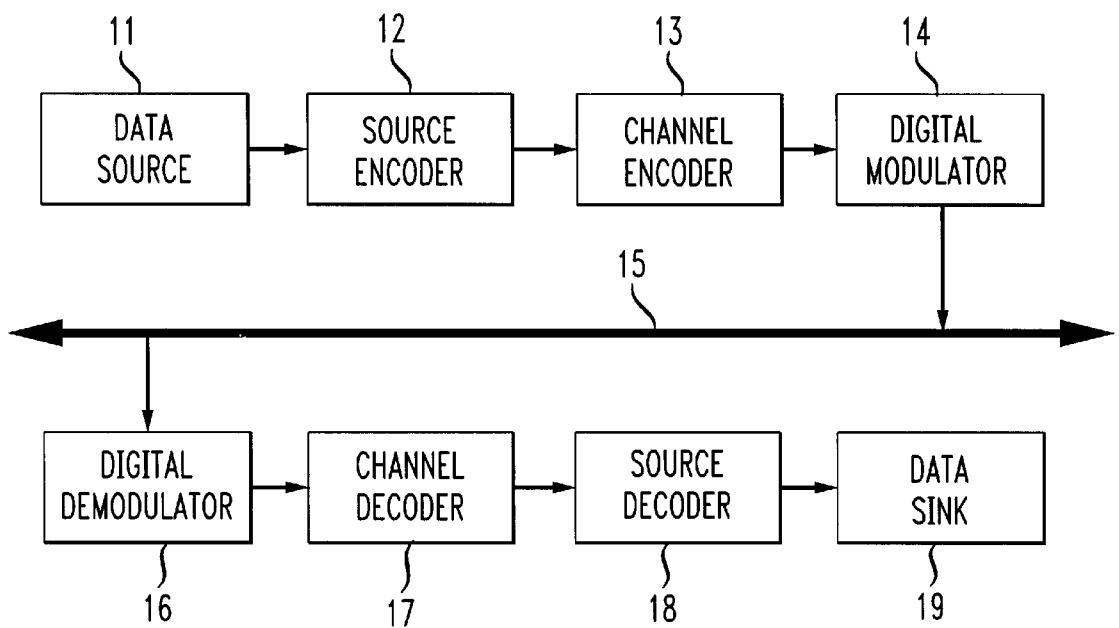
FIG. 3 shows a general diagram of elements of a communication system for purposes of describing an embodiment of the invention.

Referring now also to FIG. 3, Modems 31 and 32 contain a source encoder 12, a channel encoder 13, a digital modulator 14, to accept and transmit data on channel 15 (typically, a twisted pair) from a data source 11. Channel 15 may comprise a hybrid fiber/twisted pair channel as well as comprise a twisted pair among other possible subscriber distribution plant architectures involving twisted pair cables. Modems 31 and 32 also contain a digital demodulator 16, a channel decoder 17, and a source decoder 18 to receive the data from channel 15 and supply it to a data sink 19.

As will be recognized by those skilled in the art, source encoder 12 compresses data from data source 11 and applies the result to channel encoder 13 for error correction/detection data and applies the result to digital modulator 14. Digital modulator 14 acts as the interface with the communication channel 15 by modulating the data to generate a signal that can be applied to the communication channel 15.

Digital demodulator 16 constructs a data stream from the received signal and applies it to channel decoder 17. Channel decoder 17 corrects errors in the data stream and applies the corrected data to source decoder 18 which decompresses the data and outputs the decompressed data to data sink 19.

Figure 4:
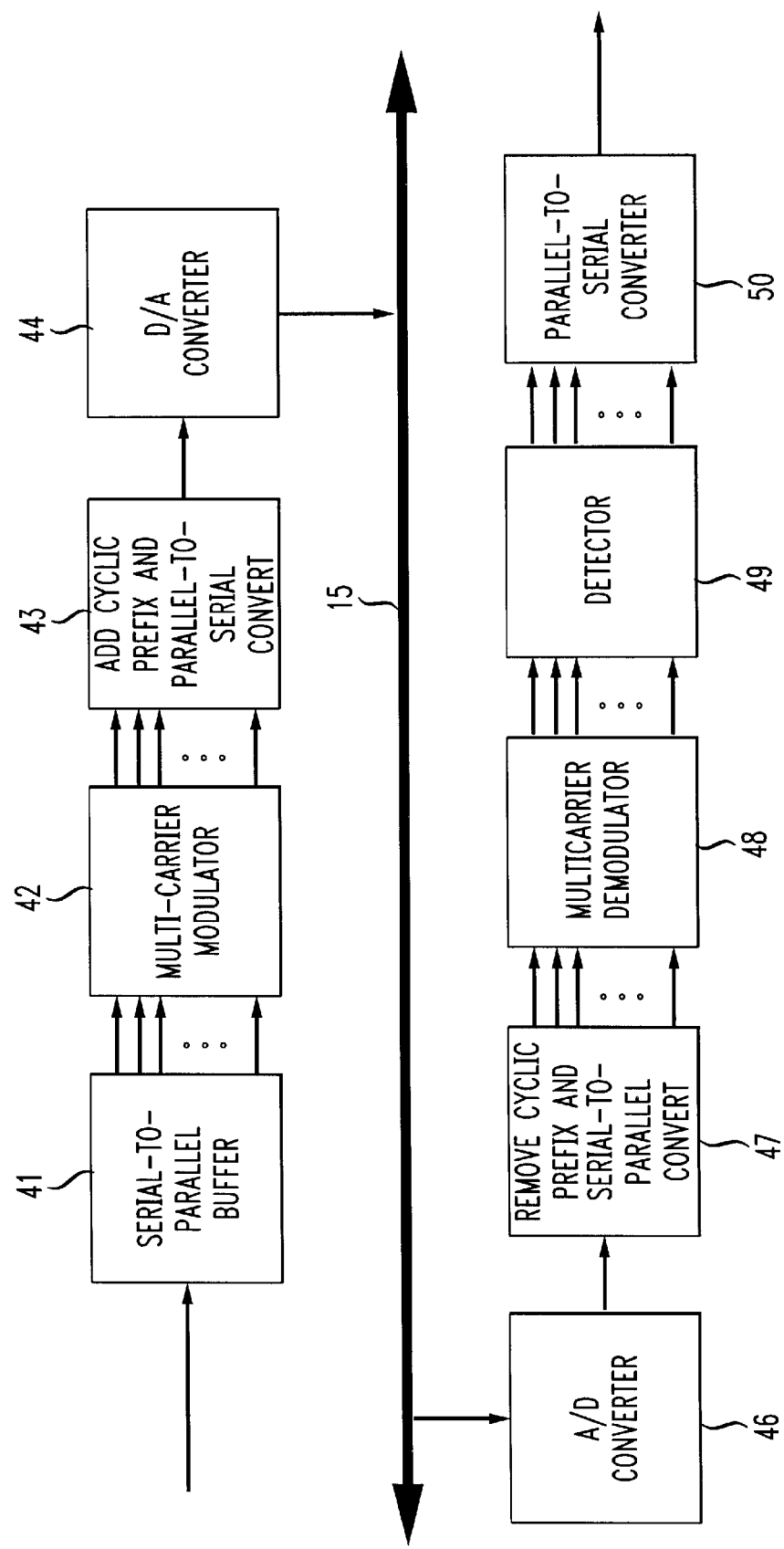
FIG. 4 shows a digital modulator and demodulator connected by a communication channel for a multitone QAM system for purposes of describing an embodiment of the invention.

Referring to FIG. 4, in a QAM multitone modulation, the spectrum is broken into multiple sub-bands or QAM channels. Digital modulator 14 generates N QAM signal tones, one for each QAM channel. Each $i^{th}$ QAM channel carries $k_i$ bits of data. A serial-to-parallel buffer 41 segments a serial stream of digital data into N frames, each having allocated to it $k_i$ bits of data. These are applied to respective inputs of a multi-carrier modulator 42 which generates a QAM tone for each channel. Multi-carrier modulator 42 generates N QAM tones, one for each channel, at the same symbol rate but with a respective constellation for each channel. That is, the $i^{th}$ QAM channel carries an $2^{ki\text{-}ary}$ QAM tone, a tone with $2^k_i$ signal points. Multi-carrier modulator 42 modulates N subcarriers by corresponding symbols to generate the N QAM signal tones using an inverse digital Fourier transform. The allocation of bits in serial-to-parallel buffer 41 is discussed in detail below.

A parallel-to-serial converter 43 adds a cyclic prefix (one known method of preventing intersymbol interference) and passes the resulting data stream through an D/A converter 44 yielding a single analog signal. After the analog signal reaches receiving modem 32, the opposite operation occurs in A/D converter 46, serial-to-parallel converter 47, and multicarrier demodulator 48 and detector 49. Multicarrier demodulator 48 strips the modulating signal from the carrier, that is, it converts the QAM tone data into data representing the original modulating symbols. Detector 49 maps the resulting symbols into a set of bits either by quantizing or soft-decision quantization. These symbols are then queued up in a serial data stream by parallel to serial converter 50.

Figure 5:
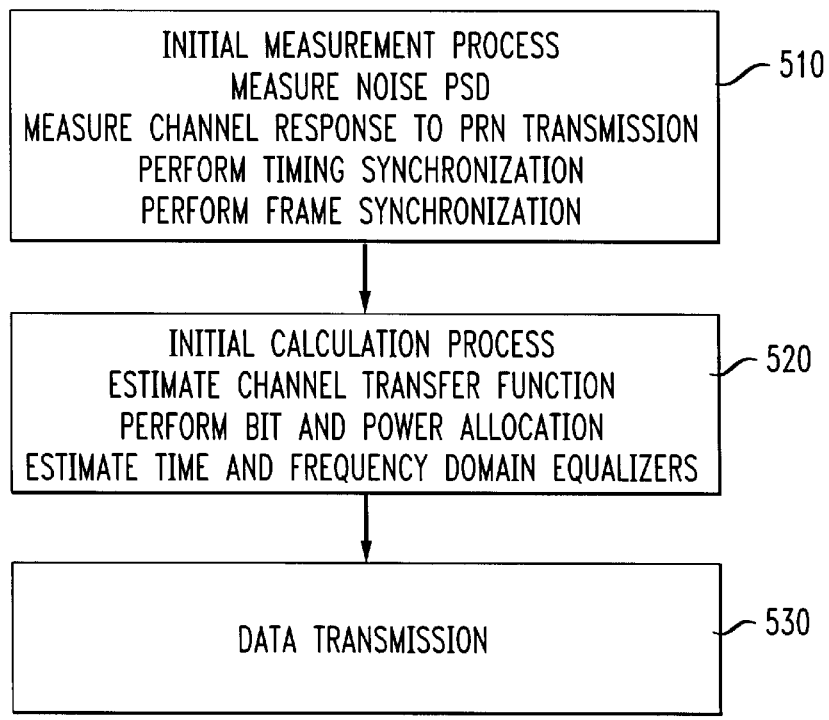
FIG. 5 illustrates the major processing steps in the operation of a DMT modem.

FIG. 5 shows the major processing steps in the operation of a DMT modem. First, the transmitter and the receiver modems perform a process of measurement 510 during which each of the two modems at the telecommunications central office (CO) and the remote terminal (RT) measure the power spectral density (PSD) of the noise over the bandwidth of interest. Then each modem transmits a known pseudo-random noise (PRN) sequence for a pre-determined duration while the respective receiving modem remains silent. The received signal is recorded for subsequent processing. The second step 520 in the initialization processing consists of estimation of the channel transfer functions by each of the two modems. The noise PSDs and the channel transfer functions are inputs to the bit and power allocation algorithm. Then, settings for any time and frequency domain equalizers can be estimated and set in the respective modems. Data transmission 530 commences after the initialization is completed.

The mathematical model for calculating the NEXT and far end cross talk (FEXT) due to the signal carried within a twisted pair of wire sources is well-known to those familiar with the prior art related to DMT technology. The prior art includes models of the power spectral densities of various interfering sources and equations used for calculating the cross talk power spectral densities. The same reference also includes the mathematical model of the NEXT caused by the transmitted power and the frequency band over which the power is transmitted.

The model of the PSD of the NEXT that could be caused by n identical power sources within a binder is given by the following expression for binders containing up to 50 pairs of wires.

$$PDS_{NEXT}(f_k) = PSD_{disturber}(f_k) \times (x_n \times f^{3/2}) \quad \text{Eq. 1}$$
$$\text{for } 0 \le f_k < \infty, n < 50, \text{ where}$$

$$x_n = 8.818 \times 10^{-14} \times \left(\frac{n}{49}\right)^{0.6} = 0.8536 \times 10^{-14} \times n^{0.6} = x_1 \times n^{0.6}.$$

This expression emphasizes that the near-end cross coupling increases in proportion to the three-halves power of the frequency. Hence, for an interfering source that has equal PSDs at frequencies $f_2$ and $\eta_1$, the NEXT that the source causes at frequency $f_2$ is greater than the NEXT at frequency $f_1$ by $$15 \times \log\left(\frac{f_2}{f_1}\right) \text{dB}.$$

Thus, equal PSDs at $f_2$ and $f_1$, result in higher NEXT PSD at $f_2$ than at $f_1$ by 4.5 dB if $f_2$ is twice as large as $f_1$. This relationship suggests a different performance function for bit and power allocation algorithms. For NEXT limited systems, it would be more appropriate to minimize the total NEXT rather than minimizing the total power consumed.

Any algorithm that is based on minimizing a weighted combination of the total power and total data rate could utilize the new performance function described in this patent application. An algorithm for simplex operation of DSL modems that depends upon minimizing the power allocation is disclosed in "An Efficient Bit Loading Algorithm for DMT Applications" by Ranjan V. Sonalkar and Richard Shively, Globecom 98, Sydney Australia, November 1998, pp 2683–2688 incorporated herein by reference. For QAM constellations, the power needed to transmit $b_k$ bits is given by the expression below.

$$E_k[b_k bits] = (2^{b_k} - 1) \cdot \left(\frac{KN_k}{3|H_k^2 G_c|}\right) \quad \text{Eq. 2}$$

$$\Delta(2^{b_k} - 1) \cdot a_k$$

The power needed to transmit one additional bit in bin k, that already contains $b_k$ bits is:

$$\Delta E_k^A = E_k[(b_k + 1)bits] - E_k[b_k bits] \quad \text{Eq. 3}$$
$$= \lfloor (2^{b_k+1} - 1) - (2^{b_k} - 1) \rfloor a_k$$
$$= a_k \cdot 2^{b_k}$$

Similarly, if bin k contains $b_k$ bits, then the power saved by removing one bit from that bin is equal to:

$$\Delta E_k^R = a_k \cdot 2^{b_k - 1} \quad \text{Eq. 4}$$

In the above expressions, $N_k$ is the noise power, and $H_k$ is the channel transfer function at frequency k. A constant $G_c$ represents the coding gain. If the coding method used in the modem provides a BER-dependent and $b_k$-dependent gain, then a simpler approach is to use a table of SNRs, S(BER, b), dependent on the two parameters, BER and the number of bits, b. Then the transmit power that would result in the appropriate SNR for BER and a $2^b$-size constellation is simply the following:

$$E_k = \frac{N_k \cdot S(BER, b_k)}{g_k} \quad \text{Eq. 5}$$

The following two expressions represent the increment in power needed for a bit-addition algorithm and the decrement in power obtained in a bit-removal algorithm, respectively. The conventional bit-addition algorithms that minimize power while maximizing the data rate would sort the array of $\Delta E_k^A$ for k=1:256 in ascending order. Similarly, the bit-removal algorithm would sort the array of $\Delta E_k^R$ quantities in the descending order. From now on, the NEXT-minimization approach will be described in terms of a bit-addition algorithm. The principle applies equally well to the previously discussed bit-removal algorithm.

$$\Delta E_k^A = \frac{N_k}{g_k} \times [S(BER, b_k + 1) - S(BER, b_k)] \quad \text{Eq. 6}$$

$$\Delta E_k^R = \frac{N_k}{g_k} \times [S, (BER, b_k) - S(BER, b_k - 1)]$$

The bit-addition algorithm requires that the array of $\Delta E_k^A$ be sorted in ascending order and a bit added to the frequency bin that requires the least increment of power. The power needed for increasing the number of bits by one bit in the frequency bin, to which a bit was added in this step, is recalculated, and the array is re-sorted. Bit allocation is then determined based on this array, such that bit allocation to frequency bins requires the least possible power for the maximum possible or the desired data rate. This process is continued until the addition of one bit in any of the frequency bins violates at least one of the constraints—power budget, power mask and maximum number of bits per frame.

The algorithm described above would minimize the total power consumed for transmitting the maximum possible number of data bits per frame, while staying within all the required constraints. A modification of the incremental power term would result in an algorithm that can minimize NEXT, instead. The incremental power term is weighted by $f_K^{3/2}$ and then the array of these weighted terms is used to determine the bit allocation. Note that the constant $x_1$ used in Eq. 1 need not be applied since it will be common to all terms and hence, will not affect the sorting order.

$$\Delta NEXT_k^R = \Delta E_k^R \times f_k^{1.5} \quad \text{Eq. 7}$$

The effect of the weighting function would be to force the allocation towards the lower frequencies. The algorithm would result in a total integrated NEXT power that would be less than the integrated NEXT power that would result from an algorithm that minimizes the total power. The array of $\Delta NEXT_k^A$ would be sorted in the ascending order for determining the frequency bins to which bits are to be added.

The algorithm can be generalized to encompass the case where the function of the transmit power is differently weighted than the three-halves power of frequency. A general performance function that can be minimized would weight the incremental power by an arbitrary function of frequency depending upon situations that may warrant it.

$$\Delta PF_k^A = \Delta E_k^A \times \theta(f_k) \quad \text{Eq. 8}$$

In the above equation $\theta(f_k)$ is the arbitrary function of frequency and the array of $\Delta PF_k^A$ would be sorted for determining the bit allocation.

Figure 6:
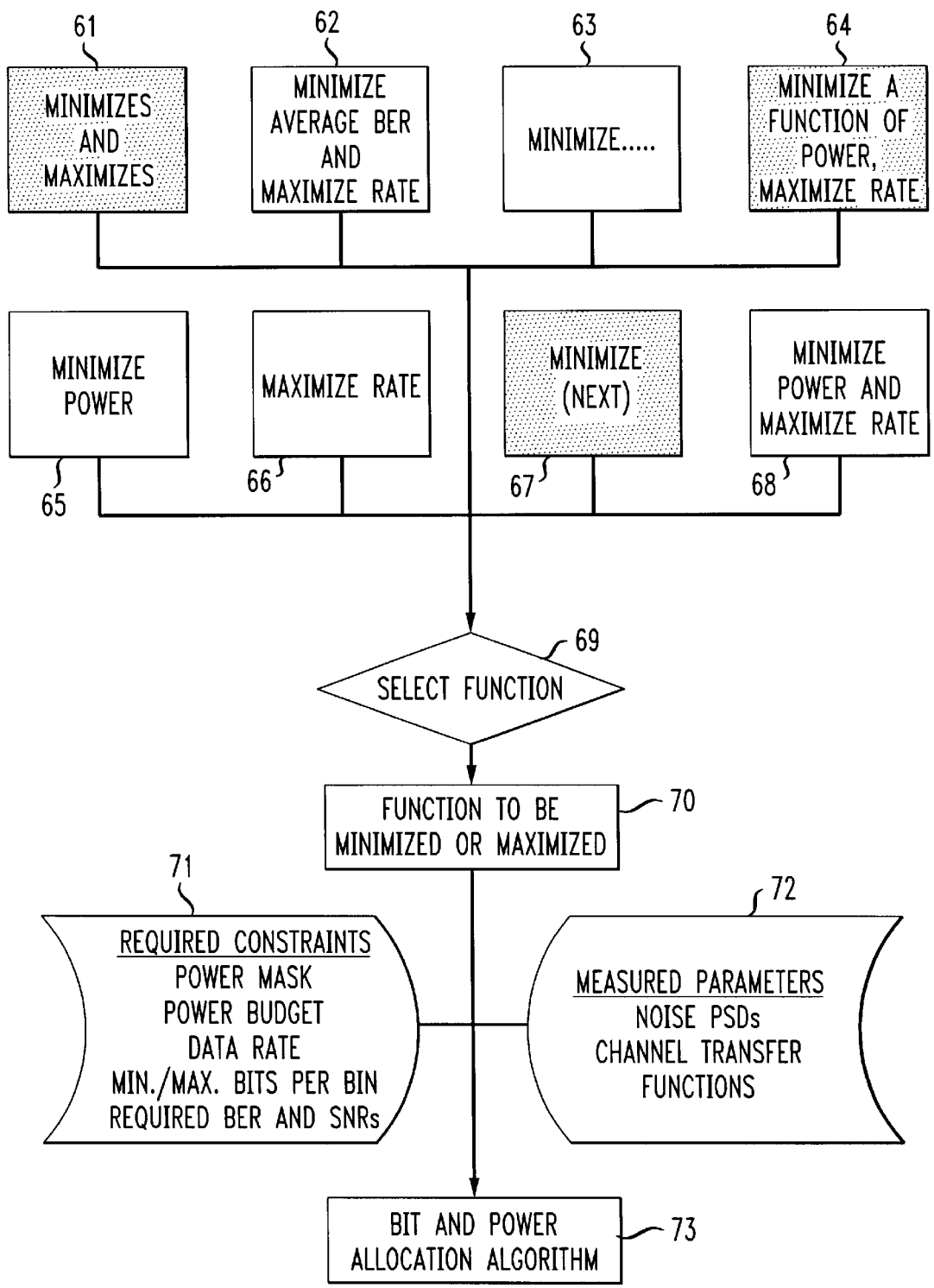
FIG. 6 schematically shows the various inputs to a bit allocation algorithm.

FIG. 6 schematically shows the various inputs to the bit allocation algorithm. The blocks 61–68 at the top of the figure represent the various objective functions that can be identified from the various algorithms that exist in the literature and include the new objective functions (represented by shaded blocks) that are defined in this document. Any algorithm that minimizes a performance function can utilize the cross-talk dependent function defined herein. FIG. 6 also includes a performance function block 63 that is left undefined to indicate the possibility that other performance functions are also possible.

Referring now to FIG. 6, function block 61, a shaded block, represents joint minimization of the NEXT and the maximization of the total data rate. Function 62 represents joint minimization of the Bit Error Rate (BER) and maximization of the total data rate. Function 63 represents any other arbitrary function that may be defined for optimization as introduced above that may come to mind of one of ordinary skill in the art. Function 64, a shaded block, represents the joint minimization of an arbitrary function of the total power and maximization of the total data rate. Function 65 represents the minimization of the total power used for transmission for a given data rate. Function 66 represents the maximization of the transmitted data rate for a given total transmit power. Function 67, a shaded block, represents the minimization of the total Cross-talk (NEXT) power for a given data rate. Function 68 represents the joint minimization of the total power and maximization of the total transmitted data rate. All of the processes or functions 61–68 provide input to function selection box 69.

The decision block 69 represents the selection of the function to be optimized for the bit and power allocation algorithm that a modem designer intends to use.

Block 70 inputs the selected function to be optimized from block 69 to the bit and power allocation algorithm 73.

Block 71 supplies the required constraints to the allocation algorithm 73. Block 72 supplies the parameters that were measured and estimated during the initial measurement and calculation processes 510 and 520 (FIG. 5).

Block 73 represents the bit and power allocation algorithm that is implemented after all the above steps 61–72 as utilized are completed.

Although preferred embodiments of the method and apparatus of the invention have been illustrated in the accompanying Drawings and described in the foregoing detailed description, it is understood that the invention is not limited to the embodiments disclosed, but is capable of numerous rearrangements, modifications, and substitutions without departing from the spirit or scope of the invention as set forth and defined by the following claims.

What we claim is:

1. In a discrete multi-tone modem, a method of minimizing cross talk over a twisted pair of a twisted pair cable binder, the method comprising the steps of:
   one of jointly minimizing near end cross talk while maximizing total data rate; jointly minimizing an arbitrary function of total power while maximizing total data rate and minimizing total near end cross talk for a given data rate;
   selecting a function to be optimized; and performing a bit and power allocation algorithm responsive to the selected function.

2. The method of claim 1 further comprising the step of estimating settings for time and frequency domain equalizers.

3. The method of claim 1 comprising the initial step of:
measuring a noise power spectral density of said twisted pair.

4. The method of claim 1 wherein said twisted pair comprises a section of a hybrid fiber twisted pair channel between a central office telecommunications modem and a remote terminal modem.

5. The method of claim 1 wherein said function selection step is responsive to one of a power minimization function, a joint average bit error rate minimization while maximizing data rare function, a maximizing data rate function and a joint power minimization and maximization of data rate function.

6. In a discrete multi-tone modem, apparatus for minimizing cross talk in a twisted pair, said apparatus comprising:
means for one of minimizing near end cross talk while maximizing total data rate, jointly minimizing an arbitrary function of total power while maximizing total data rate and minimizing total near end cross talk for a given data rate;

means for selecting a function to be optimized; and means for performing a bit and power allocation algorithm responsive to the selected function.

7. The apparatus of claim 6 further comprising means for estimating settings for time and frequency domain equalizers.

8. The apparatus of claim 6 comprising means for initially measuring a noise power spectral density of said twisted pair.

9. The apparatus of claim 6 wherein said twisted pair comprises a section of a hybrid fiber twisted pair channel between a central office telecommunications modem and a remote terminal modem.

10. The apparatus of claim 6 wherein means for selecting a function is responsive to one of a power minimization function, a joint average bit error rate minimization while maximizing data rare function, a maximizing data rate function and a joint power minimization and maximization of data rate function.

* * * * *